(12) United States Patent
Acerbis et al.

(10) Patent No.: US 9,067,741 B2
(45) Date of Patent: Jun. 30, 2015

(54) UNIT AND METHOD FOR FORMING A LAYER OF BATCHES OF GROUPS OF ARTICLES

(71) Applicant: GEBO PACKAGING SOLUTIONS ITALY S.r.l., Parma (IT)

(72) Inventors: Davide Acerbis, Parma (IT); Massimiliano Legati, Parma (IT)

(73) Assignee: GEBO PACKAGING SOLUTIONS ITALY S.R.L., Parma (IT)

(*) Notice: Subject to any disclaimer, the term of this patent is extended or adjusted under 35 U.S.C. 154(b) by 0 days.

(21) Appl. No.: 14/142,723

(22) Filed: Dec. 27, 2013

(65) Prior Publication Data
US 2014/0182998 A1 Jul. 3, 2014

(30) Foreign Application Priority Data
Dec. 28, 2012 (EP) ..................................... 12199782

(51) Int. Cl.
*B65G 47/31* (2006.01)
*B65G 47/52* (2006.01)
*B65G 47/08* (2006.01)

(52) U.S. Cl.
CPC ................ *B65G 47/31* (2013.01); *B65G 47/52* (2013.01); *B65G 47/084* (2013.01)

(58) Field of Classification Search
CPC ....... B65G 47/52; B65G 47/084; B65G 47/31
USPC ................ 198/418.1, 418.5, 419.2, 426, 431, 198/459.1, 459.8, 460.1, 461.1, 571, 575, 198/577, 579
See application file for complete search history.

(56) References Cited

U.S. PATENT DOCUMENTS

| 4,881,635 A | 11/1989 | Raschke | |
|---|---|---|---|
| 5,193,659 A * | 3/1993 | Marshall | 198/419.2 |
| 7,168,552 B2 * | 1/2007 | Katayama | 198/460.1 |
| 7,413,070 B2 * | 8/2008 | Mayer | 198/431 |
| 8,002,105 B2 * | 8/2011 | Duchemin et al. | 198/419.3 |
| 2010/0038210 A1 * | 2/2010 | Cox et al. | 198/460.1 |

FOREIGN PATENT DOCUMENTS

| DE | 102011010162 | 8/2012 |
|---|---|---|
| EP | 2052997 | 4/2009 |
| GB | 1473721 | 5/1977 |

* cited by examiner

*Primary Examiner* — Leslie A Nicholson, III
(74) *Attorney, Agent, or Firm* — Young & Thompson (57) ABSTRACT

There is disclosed a unit for forming a layer with at least one first batch and one second batch of first groups and second groups of articles, comprising: a first conveying line which may be fed with a first row of first groups and which outputs first batch separated from the remaining first groups travelling parallel to a first direction; and one second conveying line which may be fed with a second row of second groups and which outputs second batch separated from the remaining second groups travelling parallel to first direction; unit further comprises control means configured for receiving a signal associated to a misalignment between first batch and second batch along a second direction transversal to first direction, and for generating a modified first speed profile for at least one conveyor of first conveying line or of second conveying line, so as to recover misalignment.

13 Claims, 6 Drawing Sheets

UNIT AND METHOD FOR FORMING A LAYER OF BATCHES OF GROUPS OF ARTICLES

CROSS-REFERENCE TO RELATED APPLICATION

The present application claims priority to European Patent Application Serial No. 12199782.9, filed Dec. 28, 2012, the entirety of which is hereby incorporated by reference.

FIELD OF THE INVENTION

The present invention relates to a unit and a method for forming a layer of batches of groups of articles, in particular containers filled with a pourable food product.

BACKGROUND OF THE INVENTION

Bottling lines are known which comprise a plurality of units for carrying out respective operations on containers.

Very briefly, the known bottling lines comprise a rinsing unit for rinsing containers, a filling unit for filling containers with a pourable food product, a capping unit for capping the containers, and a packaging unit for packaging together a given number of containers so as to form a plurality of groups of containers.

The bottling line comprises an end station fed with groups of containers travelling on one or more rows on a horizontal conveyor along a horizontal direction.

In particular, the end station comprises a unit for forming batches of groups of containers.

The above unit is, in particular, adapted to separate a plurality of batches of groups of container of a given length along the direction from the remaining groups and to form a layer of groups of containers.

An example of end station is shown, for example, in U.S. Pat. No. 7,896,151.

The above unit substantially comprises: a distribution belt which receives a plurality of containers in abutting relationship with each other; a conveyor belt for forming a plurality of batches separated by a gap from the containers conveyed by distribution belt; and a forming belt where manipulating means, e.g. a plurality of robots, form a layer of the previously formed batches which will be part of a pallet.

Furthermore, the end unit comprises: a first motor for driving the distribution belt; a second motor for driving the conveyor belt; and a third motor for driving the forming belt.

In detail the first motor and the second motor drive the distribution belt and the conveyor belt respectively at different speeds in order to allow the separation of the batches onto the conveyor belt from the groups still travelling on the distribution belt.

Still more precisely, the first motor intermittently accelerates the first conveyor, moves it at a constant speed and decelerates the first conveyor until the latter stops.

The second motor drives the conveyor belt at a constant speed.

When the end station is fed with two or more rows of groups of containers, a need is felt within the industry to increase the throughput of the unit.

In greater detail, a need is felt within the industry to avoid that the inevitable misalignment between the rows of groups penalizes the operation of the manipulating means.

Furthermore, a need is felt to avoid that the above-mentioned inevitable misalignments amplify and propagate over time with the operation of the unit.

SUMMARY OF THE INVENTION

It is an object of the present invention to provide a unit for forming a group of articles, which meets at least one of the above requirements.

The aforementioned object is achieved by the present invention as it relates to a unit for forming a layer of batches of groups of articles.

The present invention also relates to a method for forming a layer of hatches of groups of articles.

BRIEF DESCRIPTION OF THE DRAWINGS

One preferred embodiment is hereinafter disclosed for a better understanding of the present invention, by way of non-limitative example and with reference to the accompanying drawings, in which.

DETAILED DESCRIPTION OF THE INVENTION

Figure 1:
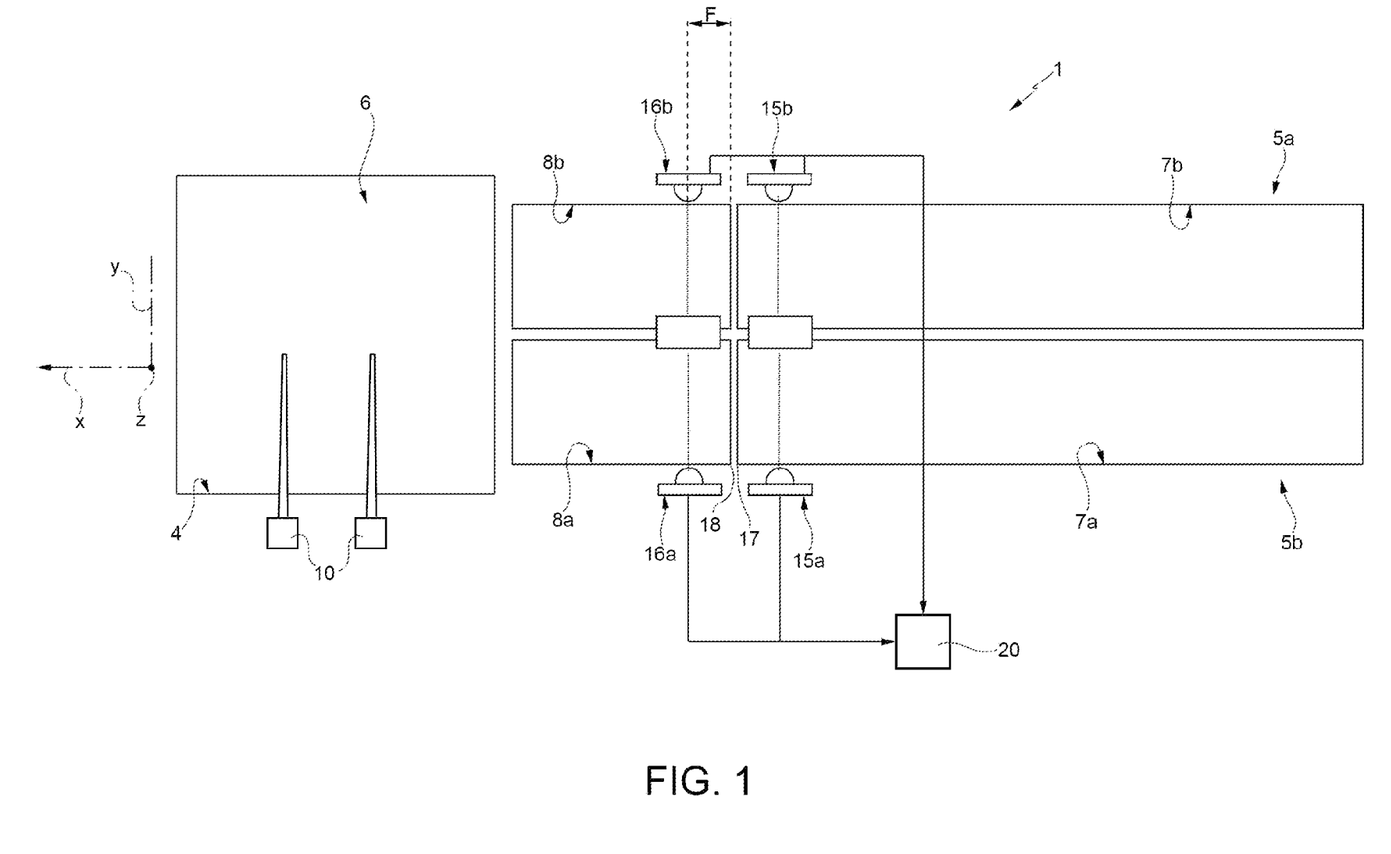
FIG. 1 is a schematic top view of a unit for forming a layer of batches of articles, according to the present invention, with parts removed for clarity.
Figure 2:
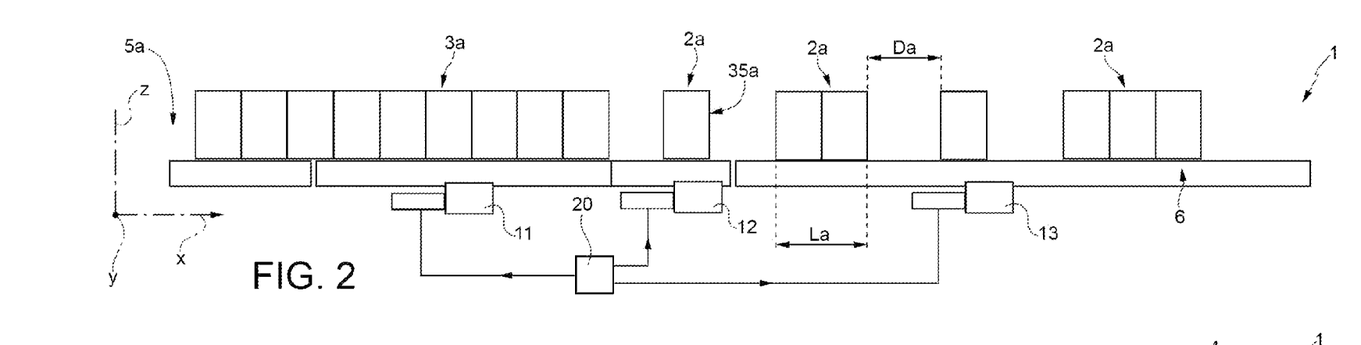
FIG. 2 is a schematic lateral view of the unit of FIG. 1.
Figure 3:
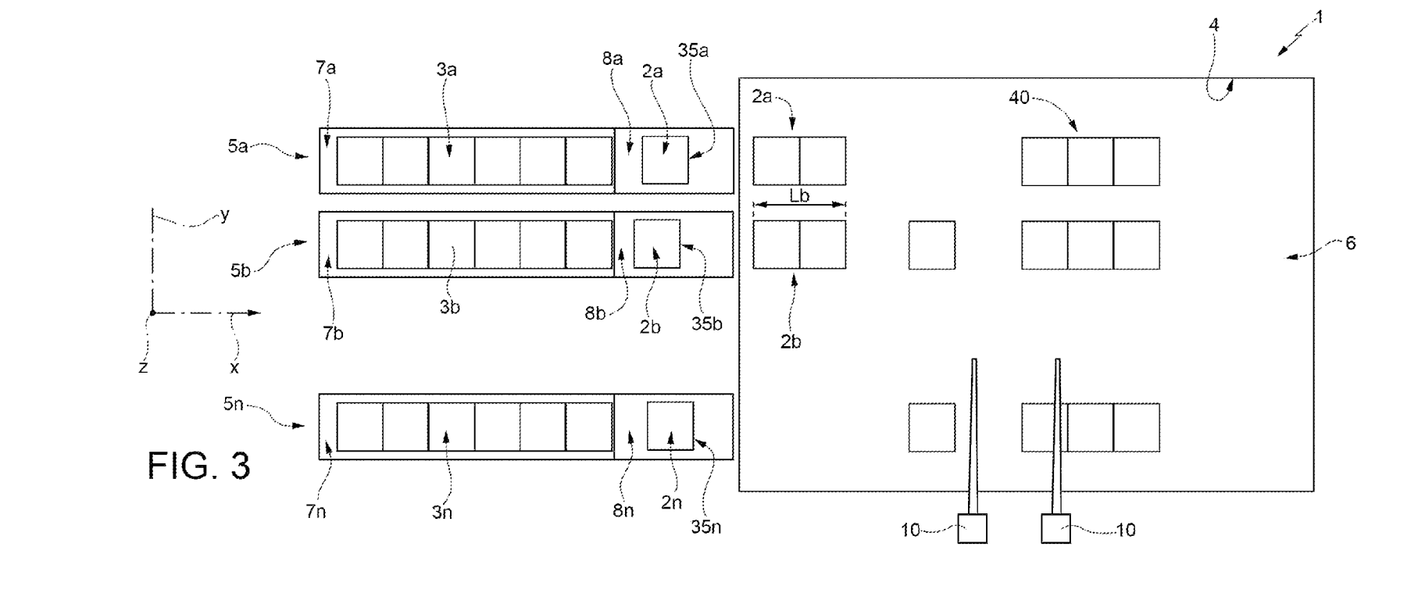
FIG. 3 is a schematic top view of the unit of FIG. 1 and, with parts removed for clarity.

With reference to FIGS. 1 to 3, numeral 1 indicates a unit for forming a layer 40 of batches 2a, 2b, . . . , 2n of groups 3a, 3b, . . . , 3n of articles, in particular containers filled with pourable products.

In detail, unit 1 is fed with a plurality of rows of relative groups 3a, 3b, . . . , 3n of packaged containers travelling along a direction X horizontal, in the embodiment shown.

Unit 1 forms, one after the other, batches 2a, 2b, . . . , 2n having each a length La, Lb, . . . , Ln and separated by a gap Da, Db, . . . , Dn measured along a direction X.

Furthermore, unit 1 creates layer 40 of batches 2a, 2b, . . . , 2n which will be eventually palletized into a not-shown pallet.

Unit 1 substantially comprises: a plurality of conveying lines 5a, 5b, . . . , 5n which are fed with relative groups 3a, 3b, . . . , 3n from a packaging machine arranged upstream of unit 1, convey a relative row of relative groups 3a, 3b, . . . , 3n along direction X and outputs, one after the other, a relative batch 2a, 2b, . . . , 2n separated from the remaining groups 3a, 3b, . . . , 3n of the relative row; and a conveyor 6 which receives separated batches 2a, 2b, . . . , 2n on respective rows by conveying lines 5a, 5b, . . . , 5n and defines an area 4 in which batches 2a, 2b, . . . , 2n are manipulated for forming layer 40 of the pallet.

In detail, each conveying lines 5a, 5b, . . . , 5n comprises, proceeding from along direction X from an output station of packaging machine towards conveyor 6, an accumulating conveyor 7a, 7b, . . . , 7n which is fed with relative groups 3a, 3b and which advances relative groups 3a, 3b, . . . , 3n in abutting relationship with each other along a relative row; and a separating conveyor $8a$, $8b$, ..., $8n$ which separates, one after the other, relative batches $2a$, $2b$, ..., $2n$ from the remaining groups $3a$, $3b$, ..., $3n$.

In detail, each conveyor $8a$, $8b$, ..., $8n$ creates a relative gap $Da$, $Db$, ..., $Dn$ parallel to direction X between relative separated batches $2a$, $2b$, ..., $2n$ and the remaining groups $3a$, $3b$, ..., $3n$ of the relative row.

Furthermore, conveyor $7a$, $7b$, ..., $7n$; $8a$, $8b$, ..., $8n$; 6 are belt conveyors.

Unit 1 comprises manipulating means 10 (only schematically shown in FIGS. 1 and 3) which interact on area 4 with separated batches $2a$, $2b$, ..., $2n$ to form layer 40.

Manipulating means 10 are movable along direction X, and along directions Y, Z orthogonal to each other and to direction X and may rotate about direction Z.

More precisely, direction Y is horizontal and direction Z is vertical, in the embodiment shown.

Gaps $Da$, $Db$, ..., $Dn$ depend on the shape of layer 40 to be formed by manipulating means 10 and, in particular, on the time required by manipulating means 10 for forming layer 40.

Manipulating means 10 may be, for example, robots.

Unit 1 also comprises: a plurality of motors 11 for driving respective conveyors $7a$, $7b$, ..., $7n$; a plurality of motors 12 for driving conveyors $8a$, $8b$, ..., $8b$; and a motor 13 for driving conveyor 6.

Motors 11, 12, 13 are brushless motors.

Unit 1 comprises, for each conveying line $5a$, $5b$, ..., $5n$ (FIG. 1): sensing means $15a$, $15b$, ..., $15n$ arranged in correspondence of relative conveyor $7a$, $7b$, ..., $7n$ for sensing the passage of groups $3a$, $3b$, ..., $3n$ on that conveyor $7a$, $7b$, ..., $7n$; and sensing means $16a$, $16b$, ..., $16n$ arranged in correspondence of relative conveyor $8a$, $8b$, ..., $8n$ for sensing the passage of batches $2a$, $2b$, ..., $2n$ on conveyor $8a$, $8b$, ..., $8n$.

Sensing means $15a$, $15b$, ..., $15n$ are preferably arranged close to an end 17 of conveyor $7a$, $7b$, ..., $7n$ adjacent to conveyor $8a$, $8b$, ..., $8n$.

Sensing means $15a$, $15b$, ..., $15n$ are adapted to sense the accumulation of a given number of groups $3a$, $3b$, ..., $3n$ onto respective conveyors $7a$, $7b$, ..., $7n$.

Sensing means $16a$, $16b$, ..., $16n$ are preferably arranged close to an end 18 of conveyor $8a$, $8b$, ..., $8n$ adjacent to conveyor $7a$, $7b$, ..., $7n$.

Sensing means $16a$, $16b$, ..., $16n$ are arranged at a distance F from end 18 measured along direction X.

Sensing means $15a$, $15b$, ..., $15n$ comprise. In the embodiment shown, a plurality of first photocells each formed by a receiver and an emitter aligned along direction Y orthogonal to direction X.

In a completely analogous manner, sensing means $16a$, $16b$, ..., $16n$ comprise, in the embodiment shown, a plurality of second photocells each formed by a receiver and an emitter aligned along a direction Y orthogonal to direction X.

Unit 1 also comprises a control unit 20 for controlling motors 11, 12, 13, so as to generate: speed profiles $V1a$, $V1b$, ..., $V1n$ for respective conveyors $7a$, $7b$ ..., $7n$; speed profiles $V2a$, $V2b$, ..., $V2n$ for respective conveyors $8a$, $8b$ ..., $8n$; and a constant speed profile V3 for conveyor 6.

Figure 5:
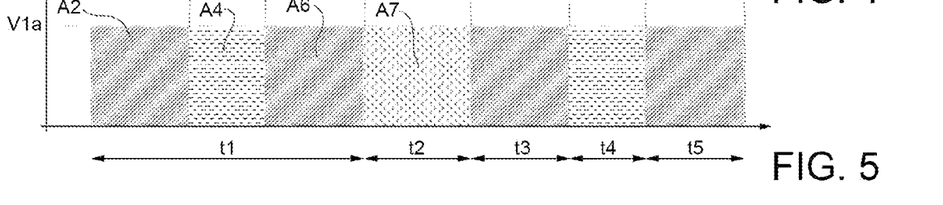

In particular, control unit 20 is configured for generating constant speed profiles $V2a$, $V2b$, ..., $V2n$ for respective conveyors $8a$, $8b$ ..., $8n$ (FIG. 5).

In other words, conveyors $8a$, $8b$ ..., $8n$ normally move at constant speeds $V2a$, $V2b$, ..., $V2n$ respectively.

Figure 4:
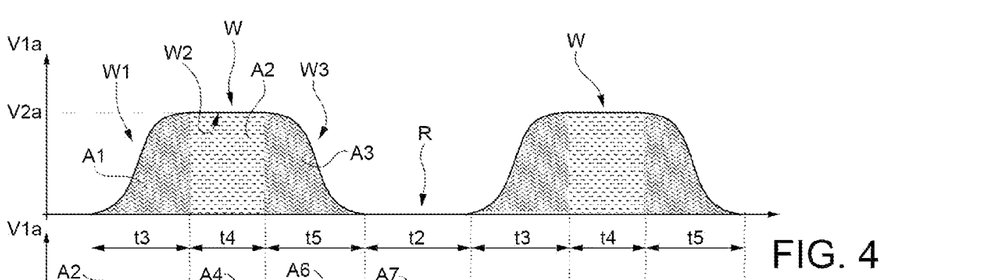
FIGS. 4 and 5 show the speed profiles versus the time of a first and a second conveyor respectively of the unit, of FIGS. 1 to 3.

Furthermore, control unit 20 is configured for controlling motor 11 in such a way that each conveyor $7a$, $7b$, ..., $7n$ cyclically moves for a time interval t1 and stops for a time interval t2 (FIGS. 4 and 5).

As a result, each speed profile $V1a$, $V1b$, ..., $V1n$ comprises a work portion W and a rest portion R.

In detail, each work portion W comprises: an accelerating section W1 along which conveyor $7a$, $7b$, ..., $7n$ moves for a length A1 along direction X; a constant speed section W2 along which conveyor $7a$, $7b$, ..., $7n$ moves for a length A2 along direction X; and a decelerating section W3 along which conveyor $7a$, $7b$, ..., $7n$ moves for a length A3 along direction X.

Conveyor $7a$, $7b$, ..., $7n$ moves along section W1, W2, W3 for respective time-intervals t3, t4, t5.

It goes without saying that t1=t3+t4+t5.

In the embodiment shown, control unit 20 control motors 11 in such a way that conveyor $7a$, $7b$, ..., $7n$: accelerates from a null speed to speed $V2a$, $V2b$, ..., $V2n$ along section W1; decelerates from speed $V2a$, $V2b$, ..., $V2n$ to a null speed along section W3.

Preferably, the speed of conveyor $7a$, $7b$, ..., $7n$ varies with respect to time like a polynomial along sections W1 and/or W3.

Preferably, the speed of conveyor $7a$, $7b$, ..., $7n$ along section W2 equals respective speed $V2a$, $V2b$, ..., $V2n$ of respective conveyor $7a$, $7b$, ..., $7n$.

Control unit 20 is configured for: receiving the signals generated by sensing means $16a$, $16b$, ..., $16n$ and associated to the passage of batch $2a$, $2b$, ..., $2n$ on respective conveyors $8a$, $8b$, ..., $8n$ at a distance F from end 18; and updating speed profiles $V1a$, $V1b$, ..., $V1n$ of respective conveyors $7a$, $7b$, ..., $7n$ along section W, on the basis of the signals generated by respective sensing means $16a$, $16b$, ..., $16n$.

In greater detail, control unit 20 is configured for updating speed profiles $V1a$, $V1b$, ..., $V1n$ of each conveyor $7a$, $7b$, ..., $7n$ from a respective nominal configuration to a respective updated configuration, every time a new corresponding batch $2a$, $2b$, ..., $2n$ is separated by the conveyor $8a$, $8b$, ..., $8n$ of the same conveying line $5a$, $5b$, ..., $5n$.

In the nominal configuration, each speed profile $V1a$, $V1b$, ..., $V1n$ is such that relative conveyor $7a$, $7b$, ..., $7n$ travels for a length $2*La$; $2*Lb$, ..., $2*Ln$ during time interval t1.

In the updated configuration, each speed profile $V1a$, $V1b$, ..., $V1n$ is such that the latter relative conveyor $7a$, $7b$, ..., $7n$ advances corresponding group $3a$, $3b$, ..., $3n$ for a relative length La−F, Lb−F, ..., Ln−F after relative sensing means $16a$, $16b$, ..., $16n$ sense the presence of respective batch $2a$, $2b$, ..., $2n$ on corresponding conveyor $8a$, $8b$, ..., $8n$.

In this way, each conveyor $7a$, $7b$, ..., $7n$ stops exactly when relative batch $2a$, $2b$, ..., $2n$ of length La, Lb, ..., Ln has been loaded on respective conveyor $8a$, $8b$, ..., $8n$, irrespective of the initial position of groups $3a$, $3b$, ..., $3n$ forming batch $2a$, $2b$, ..., $2n$.

With reference to FIG. 5, speed profiles $V2a$, $V2b$, ..., Vn are such that relative conveyors $8a$, $8b$, ..., $8n$ advance corresponding batches $2a$, $2b$, ..., $2n$ for lengths A2, A4, A6 during time intervals t3, t4, t5 respectively.

Furthermore, speed profiles $V2a$, $V2b$, ..., Vn are such that relative conveyors $8a$, $8b$, ..., $8n$ advance corresponding batches $2a$, $2b$, ..., $2n$ for respective lengths A7 during time intervals t2.

Control unit 20 is configured to calculate each length A7 associated to conveyors 8a, 8b, ..., 8n as:

$$A7 = Dn - (A2 - A1) - (A6 - A5).$$

In this way, the length lost by each conveyor 7a, 7b, ..., 7n parallel to direction X relative to conveyor 8a, 8b, ..., 8n of the same conveying line 5a, 5b, ..., 5n along section W1—which equals to A2−A1—is recovered as well as it is recovered the length lost by conveyor 7a, 7b, ..., 7n relative to conveyor 8a, 8b, ..., 8n along section W3—which equals A6−A5—.

In the embodiment shown, motors 11, 12, 13 are functionally connected to each other.

In greater detail, control unit 20 comprises a electronic cam which controls speed profiles V1a, V1b, ..., V1n and/or V2a, V2b, ..., V2n in dependency of the operation of motor 13 (FIG. 2).

In other words, motor 13 is the master element of the electronic cam and motors 11, 12 are the slave element of the above electronic cam.

In this way, the speed profile V1a, V1b, ..., V1n of conveyor 7a, 7b, ..., 7n varies with the variation of speed V2a, V2b, ..., V2n of conveyor 8a, 8b, ..., 8n.

Control unit 20 is advantageously configured for receiving a signal associated to misalignment of batches 2a, 2b, ..., 2n along direction Y, and for generating modified speed profiles V1a', V1b', ..., V1n' (FIG. 7) for conveyors 7b, ..., 7n and/or speed profiles V2a', V2b', ..., V2n' (FIGS. 14 and 15) for conveyors 8b, ..., 8n of conveying lines 5b, ..., 5n, so as to recover the above misalignment.

In particular, sensing means 16a, 16b, ..., 16n generate signals associated to the passage of the forwardmost end 35a, 35b, ..., 35n of separated batches 2a, 2b, ..., 2n from end 18.

Let assume, for example and without losing any generality, that batch 2a is the forwardmost batch, batch 2b is the rearmost batch and other batches 2n are interposed between batch 2a, 2b parallel to direction X.

In other words, batches 2a, 2b, ..., 2n are misaligned parallel to direction Y and the forwardmost end 35a of batch 2a is sensed by sensing means 16a before the forwardmost ends 35b, ..., 35n of remaining batches 2b, ..., 2n are sensed by corresponding sensing means 16b, ..., 16n.

Control unit 20 calculates on the basis of the above-mentioned signals, distances Gb−Ga; ..., Gn−Ga, where Gn is the distance along direction X between the forwardmost end 35n of batch 2n and the forwardmost ends 35a of batches 2a sensed by sensing means 16n.

On the basis of the distances Gb−Ga, ..., Gn−Ga, control unit 20 is configured for generating: modified speed profiles V2a', V2b', ..., V2n' of conveyors 8a, 8b, ..., 8n; and/or modified speed profiles V1a', V2b', ..., V2n' of conveyors 7a, 7b, ..., 7n.

Figure 14:
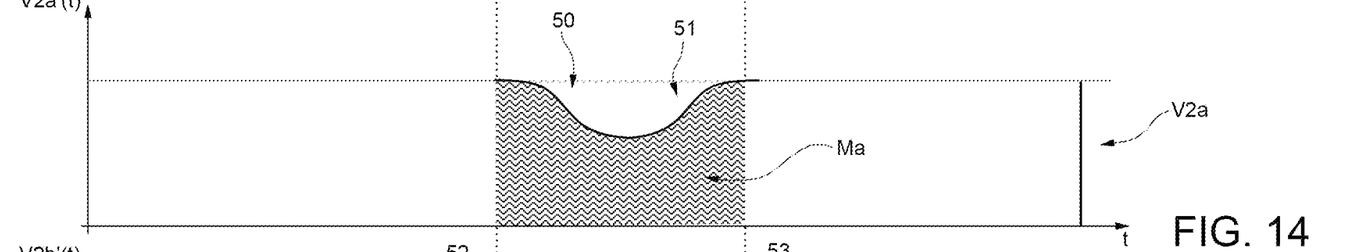
FIGS. 14 and 15 show the modified speed profiles of two second conveyors of FIG. 13.
Figure 15:
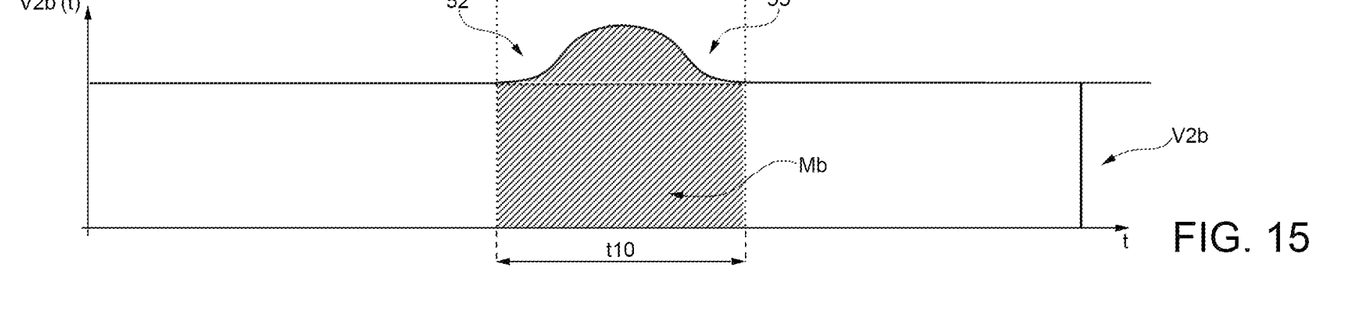

In greater detail, control unit 20 is configured for generating modified speed profile V2a', V2b', ..., V2n' in such a way that conveyors 8a, 8b, ..., 8n advance relative batches 2a, 2b, ..., 2n for respective lengths Ma, Mb, ..., Mn during the same time interval t10 (see FIGS. 14 and 15).

Lengths Mb, ..., Mn are greater than length Ma of batch 2a. Each difference Mb−Ma, ..., Mn−Ma equals the distance Gb−Ga, ..., Gn−Ga respectively.

In particular, modified speed profile V2a' associated to forwardmost batch 2a comprises, during time interval t10, (FIG. 14): a decelerating section 50 from constant speed V2a, V2b, ..., V2n to a minimum speed value; and an accelerating section 51 from minimum speed value to constant speed V2a, V2b, ..., V2n.

In other words, control unit 20 is configured for generating varied speed profile V2a' in such a way that conveyor 7a advances forwardmost batch 2a for a distance smaller than the distance V2a*t10 during time interval t10 (FIG. 14).

In this way, forwardmost batch 2a and relative conveyor 7a are slowed down by control unit 20.

Furthermore, varied speed profiles V2b', ..., V2n' associated to respective other batches 2b, ..., 2n comprises, during time interval t10: an accelerating section 52 from constant speed V2b, ..., V2n to a maximum speed value; and a decelerating section 53 from maximum speed value to constant speed V2b, ..., V2n.

In other words, control unit 20 is configured for generating varied speed profile V2b', ..., V2n' in such a way that conveyors 7b, ..., 7n advances further batches 2b, ..., 2n for relative distances Mn greater than the distances V2b*t10, ..., V2n*t10 during time interval t10.

In this way, delayed batches 2b, ..., 2n are accelerated by control unit 20 during time interval t10.

Figure 7:
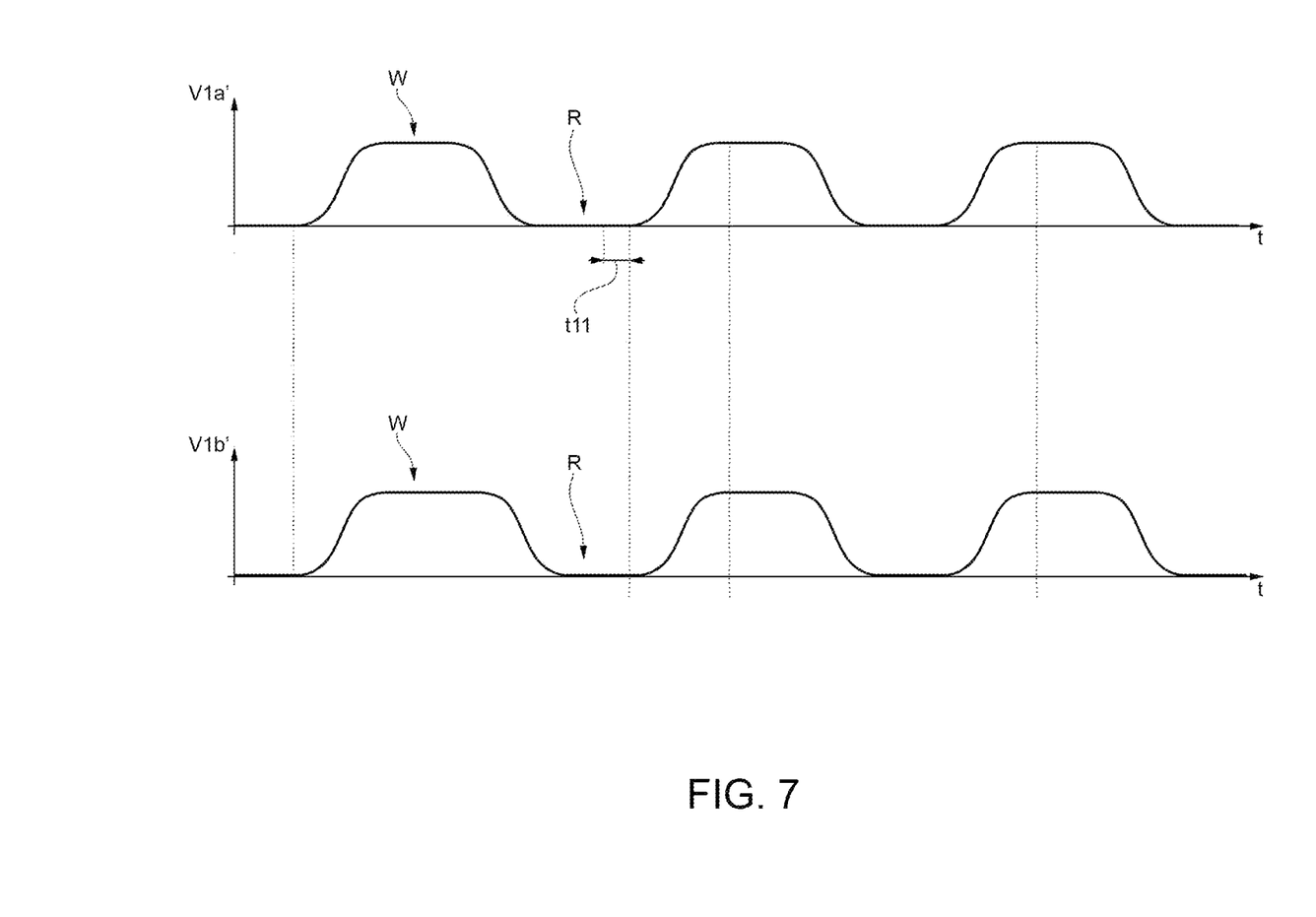
FIG. 7 shows the modified speed profiles of respective first conveyors of the unit of FIGS. 1 to 3.
Figure 8:
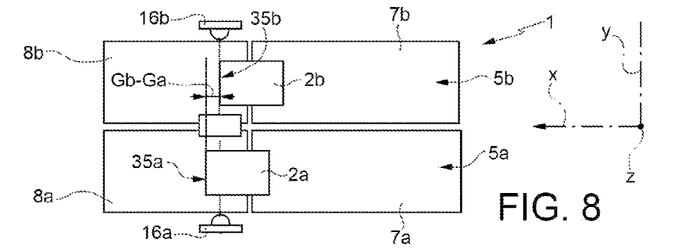
FIGS. 8 to 12 show respective subsequent steps of the operation of the unit of FIGS. 1 to 5.
Figure 9:
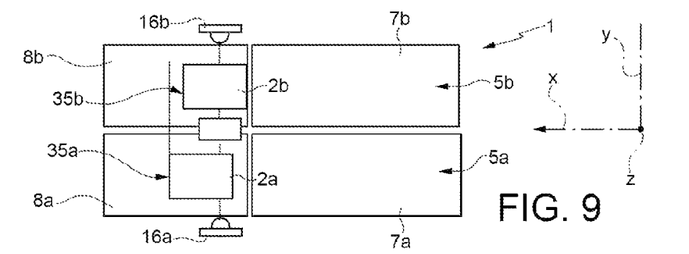

Furthermore, control unit 20 is configured for generating speed profiles V1a', V1b', ..., V1n' of relative conveyors 7a, 7b, ..., 7n, on the basis of distances Gb−Ga, ..., Gn−Ga sensed by sensing means 16a, 16b, ..., 16n (FIG. 7).

In this way, control unit 20 act on conveyors 7a, 7b, ... 7n before the separation of batches 2a, 2b, ..., 2n on conveyors 8a, 8b, ..., 8n, in order to contain the propagations of misalignment of batches 2a, 2b, ..., 2n along direction Y.

In greater detail, control unit 20 is configured for stopping conveyors 7a, ..., 7n for respective time intervals t11 (FIG. 7) necessary to align again groups 3a, 3b, ..., 3n which are still travelling on conveyors 7a, ..., 7n.

In other words, as groups 3a, ..., 3n are stopped for respective time interval, the rearmost batch 2b reaches the above groups 3a, ..., 3n.

Once all groups 3a, 3b, ..., 3n intended to form respective batches 2a, 2b, ..., 2n are aligned, corresponding conveyors 7a, 7n, ..., 7n start again.

In particular, control unit 20 is configured for extending rest sections R of modified speed profiles V1a', V1b', ..., V1n' of conveyors 7a, 7b, ..., 7n over respective time intervals t11 (FIG. 7).

The above-mentioned time intervals t11 are calculated by control unit 20 on the basis of distances Gb−Ga, Gn−Ga, in such a way that work sections W of all modified speed profiles V1a', V1b', ..., V1n' of conveyors 7a, 7b, ..., 7n re-start together at the same moment immediately after time interval t11, as shown in FIG. 7.

Control unit 20 is also configured for arresting conveyors 7a, 7b, ..., 7n in case the maximum of distances Gb−Ga, ..., Gn*Ga is greater than a threshold value.

A software is loaded onto control unit 20 which, when executed, implements the above operations.

In use, conveying lines 5a, 5b, ..., 5n receive relative respective rows of groups 3a, 3b, ..., 3n from the upstream packaging machine and convey the respective rows parallel to direction X.

Figure 6:
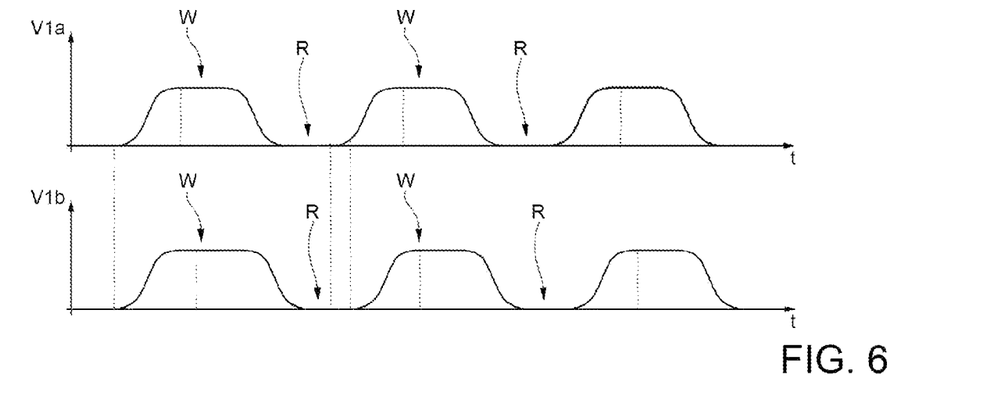
FIG. 6 shows the speed profiles of two first conveyors of the unit of FIGS. 1 to 3.

In greater detail, each conveyor 7a, 7b, ..., 7n cyclically advance for a time interval t1 and rests for a time interval t2, following the speed profile V1a, V1b, ..., V1n (FIGS. 5 and 6).

More precisely, each conveyor 7a, 7b, ..., 7n moves for lengths A1, A2, A3 for respective time intervals t3, t4, t5.

At the same time, conveyors 8a, 8b, ..., 8n move according to respective profiles V2a, V2b, ..., V2n.

Accordingly, when each conveyor 7a, 7b, ..., 7n stops, the adjacent conveyor 8a, 8b, ..., 8b of the same conveying lines 5a, 5b, ..., 5n continues to move at speed V2.

In this way, each conveyor 8a, 8b, ..., 8b separates, one after the other, batches 2a, 2b, ..., 2n from the remaining groups 3a, 3b, ..., 3n of the same row.

More precisely, each batch 2a, 2b, ..., 2n is distanced from the respective remaining groups 3a, 3b, ..., 3n still travelling onto respective conveyor 7a, 7b, ..., 7n for gap Da, Db, ..., Dn.

Sensing means 16a, 16b, ..., 16n detect the passage of the forwardmost ends 35a, 35b, ..., 35n of relative batches 2a, 2b, ..., 2n and generate a signal associated to the distances of the above-identified forwardmost ends 35a, 35b, ..., 35n of relative batches 2a, 2b, ..., 2n from end 18.

Control unit 20 receives the signal generated by sensing means 16a, 16b, ..., 16n and updates the speed profile V1a, V1b, ..., V1n of relative conveyors 7a, 7b, ..., 7n.

In detail, control unit 20 controls each motor 11 in such a way that relative conveyor 7a, 7b, ..., 7n and, therefore, relative batches 2a, 2b, ..., 2n travels for a length La–F, Lb–F, ..., Ln–F after sensing means 16a, 16b, ..., 16n have detected the passage of the forwardmost end 35a, 35b, ..., 35n of same batch 2a, 2b, ..., 2n.

In this way, it is ensured that the whole length La, Ln, ..., Ln of each batch 2a, 2b, ..., 2n is separated by respective conveyor 7a, 7b, ..., 7n from respective remaining groups 3a, 3b, ..., 3n.

In other words, each conveyor 7a, 7b, ..., 7n stops after the whole length La, Lb, ..., Ln of each batch 2a, 2b, ..., 2n has been separated by conveyor 8a, 8b, ..., 8n from the remaining groups 3a, 3b, ..., 3n.

Furthermore, control unit 20 calculates length A7 for each conveyor 8a, 8b, ..., 8n as:

$$A7 = Dn - (A2-A1) - (A6-A5).$$

In the following of the present description, let us assume that, proceeding along direction X from conveyors 7a, 7b, ..., 7n to conveyor 6, batch 2a is the forwardmost one, batch 2b is the rearmost one and remaining batches 2n are interposed between batch 2a and batch 2b (FIGS. 8 to 12).

In other words, let us assume that batches 2a, 2b, ..., 2n are travelling onto respective conveyors 8a, 8b, ..., 8n misaligned relative to direction Y.

On the basis of the signals generated by sensing means 16a, 16b, ..., 16n, control unit 20 calculates the distances Gn–Ga of each batch 2n from the forwardmost batch 2a.

Furthermore, on the basis of the above-identified signals, control unit 20 generates: modified speed profiles V1a', V1b', ..., V1n' for respective conveyors 7a', 7b', ..., 7n' (FIG. 7); and modified speed profiles V2a', V2b', ..., V2n' for respective conveyors 8a', 8b', ..., 8n' (FIG. 14).

In greater detail, control unit 20 generates modified speed profiles V2a', V2b', ..., V2n' in such a way that conveyors 8a, 8b, ..., 8n advances relative batches 2a, 2b, ..., 2n for respective lengths Ma, Mb, ..., Mn during the same interval time t10 (FIGS. 14 and 15).

Lengths Mb, ..., Mn associated to delay batches 2b, ..., 2n are greater than length Ma. Each difference Mb–Ma, ..., Mn–Ma equals Gb–Ga, ..., Gn–Ga respectively.

In this way, in the same time interval t10, conveyor 8a advances batch 2a for the minimum length Ma, conveyor 8b advances batch 2b for the maximum length Mb, and conveyors 8n advance relative batches 2n for respective intermediate lengths Mn, so as to recover the misalignments along direction Y associated by respective distances Gb–Ga, ..., Gn–Ga.

In particular, control unit 20 generates modified speed profile V2a' for conveyor 8a in such a way that the forwardmost batch 2a decelerates along section 50 and accelerates along section 51 during time interval t10 (FIG. 14).

Furthermore, control unit 20 generates modified speed profile V2b', ..., V2n' in such a way that delayed batches 2b, ..., 2n accelerate along section 52 and decelerate along section 53 (FIG. 15).

Figure 10:
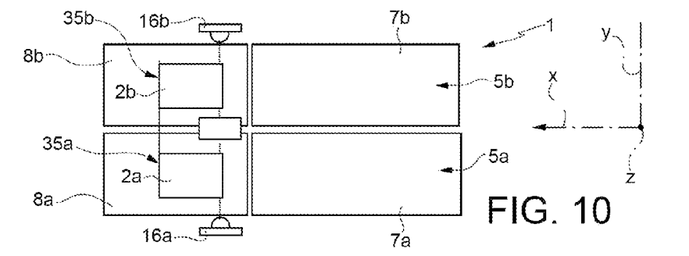
Figure 11:
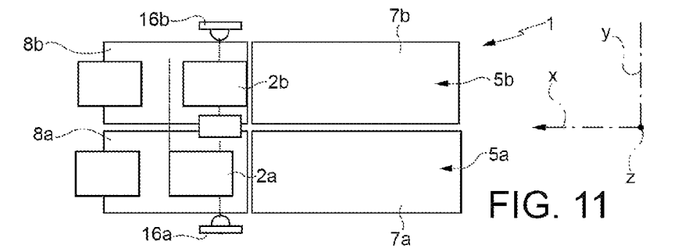
Figure 12:
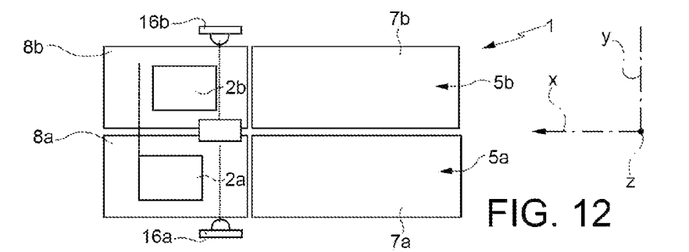
Figure 13:
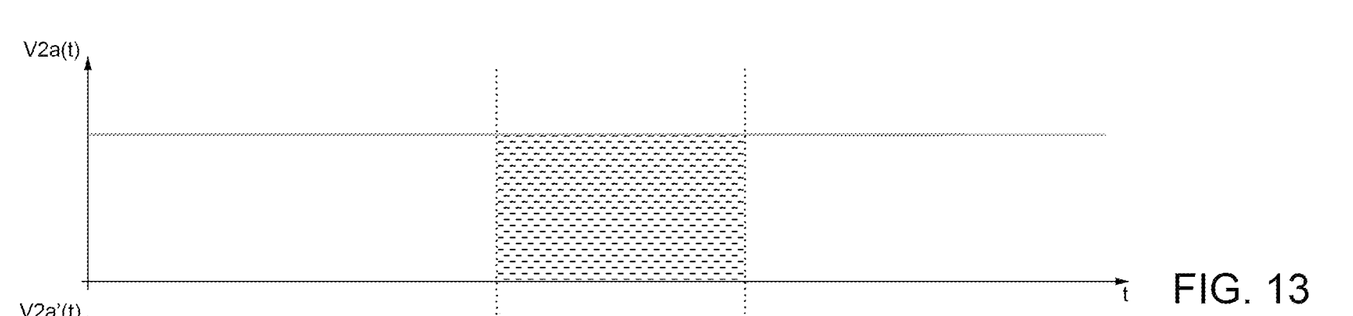
FIG. 13 shows the speed profile of the second conveyor of the unit of FIG. 1 to 3.

At the end of interval time t10, batches 2a, 2b, ..., 2n are all aligned along direction Y onto respective conveyors 8a, 8b, ..., 8n and are, afterwards, moved at constant speed V2a, V2b, ..., V2n (FIG. 10).

Furthermore, control unit 20 stops conveyors 7a, ..., 7n for respective intervals, which are necessary to align again groups 3a, 3b, ..., 3n still travelling on the same conveyors 7a, 7b, ..., 7n.

In this way, groups 3b, ..., 3n which are travelling onto relative conveyor 7a, 7b, ..., 7n in delay relative to group 3a travelling on conveyor 7a can reach group 3a upstream of conveyors 8a, 8b, ..., 8n.

Still more precisely, control unit 20 generates modified speed profiles V2a', V2b', ..., V2n' with respective sections R extended for respective time intervals t11 over respective time-intervals and in such a way that corresponding work sections W re-start again at the same moment, as shown in FIG. 7.

In case the maximum of distances Gb–Ga, ..., Gn–Ga exceeds the threshold value, control unit 20 stops conveyors 7a, 7b, ..., 7n.

The operation of conveyors 7a, 7b, ..., 7n restarts when all the batches 2a, 2b, ..., 2n present on conveyors 8a, 8b, ..., 8n have been fed to conveyor 6.

Batches 2a, 2b, ..., 2n are manipulated onto area 4 of conveyor 6 by manipulating means 10, so as to form layer 40 of the pallet.

Speed V3 may be adjusted in dependence of the number of groups 3a, 3b, ..., 3n fed conveyors 7a, 7b, ..., 7n and of the number of groups 3a, 3b, ..., 3n loaded on conveyor 7a, 7b, ..., 7n.

Due to the fact that motors 11, 12, 13 are functionally connected by an electronic cam, speed profile V1 varies as a result of the variation of speed V2.

Each gap Da, Db, ..., Dn is set on the basis of the shape of layer 40 to be formed by manipulating means 10 and of the time required by manipulating means 10 to form layer 40.

From an analysis of the features of unit 1 and of method for forming layer 40 made according to the present invention, the advantages it allows to obtain are apparent.

In particular, control unit 20 generates modified speed profiles V1a', V1b', ..., V1n' for conveyors 7a, 7b, ..., 7n and modified speed profiles V2a', V2b', ..., V2n' for conveyors 8a, 8b, ..., 8n, on the basis of distances Gb–Ga, Gn–Ga between the forwardmost batch 2a and the remaining batches 2b, ..., 2n along direction X.

In this way, when they reach conveyor 6, batches 2a, 2b, ..., 2n are aligned along direction Y (FIG. 10).

Thanks to the fact that manipulating means 10 operate on aligned batches 2a, 2b, ..., 2n, the time necessary to manipulating means 10 to create layer 40 is dramatically reduced when compared with the other known solutions and the throughput of unit 1 is accordingly increased.

This is because the number of rotations required to manipulating means 10 for forming layer 40 is reduced, thanks to the fact that batches 2a, 2b, ..., 2n are aligned along direction Y.

For the same reasons, there is no reason for introducing additional device acting on area 4 for the purpose of aligning batches 2a, 2b, ..., 2n.

Due to the fact that control unit 20 generates modified speed profiles V1a', V1b', ..., V1n' also for conveyors 7a, 7b, ..., 7n arranged downstream of conveyors 8a, 8b, ..., 8n, the risk of amplifying and propagating the misalignment to subsequent batches processed by unit 1 is dramatically reduced.

Finally, it is apparent that modifications and variants not departing from the scope of protection of the claims may be made to unit 1 and method for forming layer 40.

What is claimed is:

1. A unit for forming a layer of at least one first batch and one second batch of respective first groups and second groups of articles, comprising:
   a first conveying line which may be fed with a first row of said first groups and which outputs, in use, said first batch separated from the remaining said first groups travelling parallel to a first direction, wherein said first conveying line comprises a first separating conveyor which separates, in use, said first batch from said remaining said first groups travelling, in use, in abutting relationship;
   at least one second conveying line which may be fed with a second row of said second groups and which outputs, in use, said second batch separated from the remaining said second groups travelling parallel to said first direction, wherein said second conveying line comprises a second separating conveyor which separates, in use, said second batch from said remaining said second groups travelling, in use, in abutting relationship; and
   control means configured for receiving a signal associated to a misalignment between said first batch and second batch along a second direction transversal to said first direction, and for generating a first modified speed profile for said first separating conveyor of said first conveying line and/or a second modified speed profile for said second separating conveyor of said second conveying line, so as to recover said misalignment.

2. The unit of claim 1 wherein said signal is associated to the fact that said first batch is the forwardmost one along said first direction and that said second batch is delayed with respect to said first batch, proceeding according to the advancing direction of said first batch and second batch;
   said control means being configured for moving, on the basis of said signal;
   said first separating conveyor for a first length and for a time interval;
   said second separating conveyor for a second length and for said time interval;
   said first length being smaller than said second length; and
   the difference between said second length and said first length (Ma) being associated to said signal.

3. The unit of claim 2 wherein said first modified speed profile generated for said first separating conveyor comprises subsequently:
   at least one first decelerating section from a speed constant value to a minimum speed value; and
   at least one first accelerating section from said minimum speed value to said constant value.

4. The unit of claim 2 wherein said second modified speed profile generated for said second separating conveyor comprises subsequently:
   at least one second accelerating section from said speed constant value to a maximum speed value; and
   at least one second decelerating section from said maximum speed value to said constant speed value.

5. The unit of claim 1 wherein said first conveying line and said second conveying line comprise a first accumulating conveyor and a second accumulating conveyor respectively;
   said first accumulating conveyor being controllable by said control means, and adapted to convey said first row of said first groups in said abutting relationship and to feed said first groups to said first separating conveyor;
   said second accumulating conveyor being controllable by said control means, and adapted to convey said second row of said second groups in an abutting relationship and to feed said second groups to said second separating conveyor; and
   said control means being configured for generating a third modified speed profile of said first accumulating conveyor and/or a fourth modified speed profile of said second accumulating conveyor, on the basis of said signal.

6. The unit of claim 5 wherein said third modified speed profile comprises, in turn:
   an operative section along which respective said first accumulating conveyor moves;
   a rest section along which respective said first accumulating conveyor stops; and
   said control means being configured for extending said rest section for a second time interval necessary to align said first groups and second groups along said second direction.

7. The unit of claim 1 further comprising a third conveyor fed, in use, by said first separating conveyor and said second separating conveyor with said first batch and second batch respectively;
   said third conveyor defining an area in which said first and second batch may be manipulated for forming said layer; and
   said control means being configured for controlling said first separating conveyor and second separating conveyor respectively on the basis of a speed of said third conveyor.

8. The unit of claim 7 wherein said first conveying line and said second conveying line comprise a first accumulating conveyor and a second accumulating conveyor respectively and wherein said control means is configured for controlling said first accumulating conveyor and second accumulating conveyor on the basis of said speed of said third conveyor.

9. The unit of claim 1 further comprising sensing means adapted to sense the relative position along said first direction of said first batch and second batch respectively onto said first separating conveyor and said second separating conveyor respectively.

10. A method of forming a layer of at least one first batch and one second batch of respective first groups and second groups of articles, comprising the steps of:
    i) feeding a first conveying line with a first row of said first groups;
    ii) separating said first batch of said first groups travelling parallel to a first direction from the remaining said first groups on said first conveying line, said first groups travelling in abutting relationship on a first separating conveyor of said first conveying line;
    iii) feeding a second conveying line with a first row of said second groups;
    iv) separating said second batch of said second groups travelling parallel to said first direction from the remaining said second groups on said second conveying line, said second groups travelling in abutting relationship on a second separating conveyor of said second conveying line;
    v) generating a signal associated to the misalignment between said first batch and said second batch along a second direction transversal to said first direction; and
    vi) generating, on the basis of said signal, a first modified speed profile for said first separating conveyor of said first conveying line and/or a second modified speed profile for said second separating conveyor of said second conveying line, so as to recover said misalignment.

11. The method of claim 10 wherein said step v) comprises a step x) of detecting that said first batch is the forwardmost one along said first direction and that the second batch is delayed with respect to said first batch, proceeding according to the advancing direction of said first batch and second batch; said step ix) comprising the steps of:
   xi) moving said first separating conveyor associated to said forwardmost first batch for a first length and for a first time interval; and
   xii) moving said second separating conveyor for a second length and for said first time interval;
   said first length being smaller than said second length;
   the difference between said second length and said first length being associated to said signal.

12. The method of claim 11, wherein said step iv) comprises the steps of:
   xiii) accelerating said first separating conveyor from a constant speed value to a maximum speed value;
   xiv) decelerating said first separating conveyor from said maximum speed value to said constant speed value;
   xv) decelerating said second separating conveyor from said constant speed value to a minimum speed value; and
   xvi) accelerating said second separating conveyor from said minimum speed value to said constant speed value.

13. The method of claim 10 wherein said step i) comprises the steps of:
   xvii) accumulating said first groups in an abutting relationship on a first accumulating conveyor;
   xvii) feeding said first groups from said first accumulating conveyor to said first separating conveyor;
   said step ii) the steps of:
   xviii) accumulating said second groups in an abutting relationship on a second accumulating conveyor;
   xix) feeding said second groups from said second accumulating conveyor to said second separating conveyor; and
   said step xi comprising the step xx) of modifying a third speed profile of said first accumulating conveyor and/or a fourth speed profile of said second accumulating conveyor, on the basis of said signal in order to recover said misalignment.

* * * * *